United States Patent [19]

Ishikawa

[11] Patent Number: 5,420,496

[45] Date of Patent: May 30, 1995

[54] ELECTRONIC DEVICE

[75] Inventor: Hiroaki Ishikawa, Kamakura, Japan

[73] Assignee: Mitsubishi Denki Kabushiki Kaisha, Tokyo, Japan

[21] Appl. No.: 998,405

[22] Filed: Dec. 29, 1992

[30] Foreign Application Priority Data

Jan. 7, 1992 [JP] Japan ................... 4-000887

[51] Int. Cl.$^6$ ................................. H02J 7/32
[52] U.S. Cl. ............................................ 320/56
[58] Field of Search ................. 320/2, 56; 455/89

[56] References Cited

U.S. PATENT DOCUMENTS

| 4,356,481 | 10/1982 | Kuki | 340/636 |
| 4,636,741 | 1/1987 | Mitzlaff | 455/89 X |
| 5,254,931 | 10/1993 | Martensson | 320/22 |

FOREIGN PATENT DOCUMENTS

| 4022887 | 2/1991 | Germany . |
| 56-16625 | 4/1981 | Japan . |
| 56-121344 | 9/1981 | Japan . |
| 58-141590 | 9/1983 | Japan . |
| 60-70998 | 5/1985 | Japan . |
| 60-90782 | 6/1985 | Japan . |
| 61-185235 | 11/1986 | Japan . |
| 18821 | 1/1990 | Japan . |
| 2238675 | 6/1991 | United Kingdom . |

Primary Examiner—Steven L. Stephan
Assistant Examiner—E. To
Attorney, Agent, or Firm—Wolf, Greenfield & Sacks

[57] ABSTRACT

In an electronic device which can be energized from one of a plurality of types of power sources, having an external power source connector for connection with an external power source, a power source identifying circuit identifies the power source from which the electronic device is energized, and a control circuit controls consumption of the power in accordance with the power source identified by the power source identifying means. The identification of the power source is made in accordance with the voltage on the connector. Additionally, the sum of the voltage on the connector and the voltage of the built-in battery may be used for the identification.

15 Claims, 7 Drawing Sheets

| | AC ADAPTER; LARGE-CAPACITY AC ADAPTER | EXTERNAL BATTERY | CAR BATTERY |
|---|---|---|---|
| VOLTAGE ON 1a | 16 V | 8~9.6 V | 12 V |

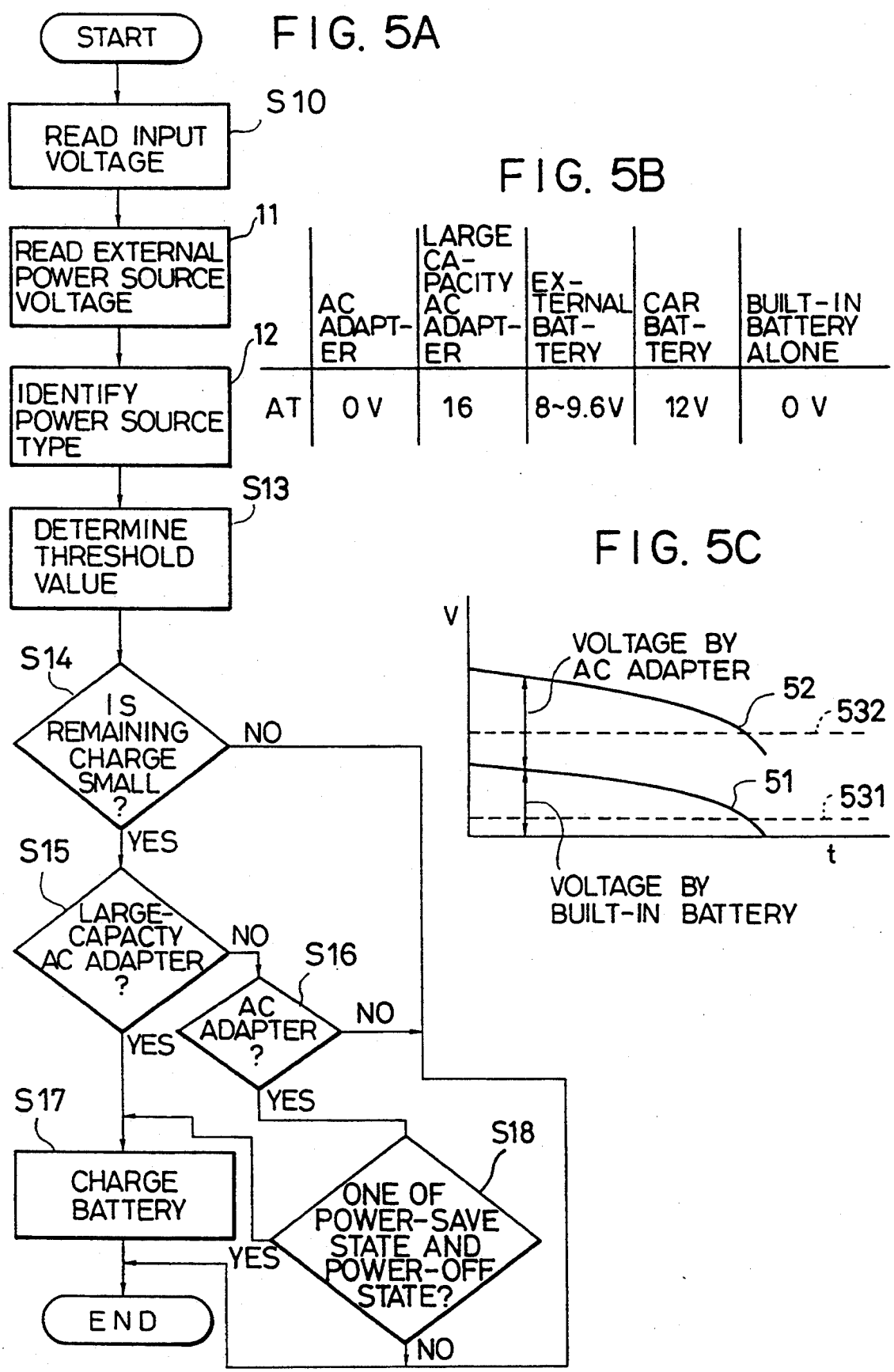

5,420,496

ELECTRONIC DEVICE

BACKGROUND OF THE INVENTION

The present invention relates to an electronic device which can be energized from one of a plurality of power sources, including a battery or the like built in it and an external power source, such as an AC adapter, and an external battery, and in particular to an electronic device capable of detecting a voltage input through a power source connector and finding which of the AC adapter, external battery and the like is being connected, and controlling consumption of power depending on which power sources the electronic device is being energized.

FIG. 6 is a perspective view from the rear side of a notebook-type personal computer in the prior art. The personal computer comprises a main unit 20, provided with a dedicated DC-IN (AC adapter) connector 21, and a dedicated external battery connector terminal 22. For connection with an AC adapter, the DC-IN connector 21 is used, while for connection with an external battery, the external battery connector 22 is used.

FIG. 7 is a block diagram showing a power supply circuit in the prior art, which is shown for example in Japanese Patent Kokoku Publication No. 16625/1981, for energizing an electronic device, in particular an electronic device main circuit 78. A connector 71 is provided on the electronic device for connection with an external power source, such as an AC adapter, an external battery or a car battery, via a plug, not shown, connected to the external power source.

The connector 71 has terminals 71a, 71b, 71c and 71d. A switch 77 is opened when a magnetic relay 76 is energized. On the basis of the state of connection of the four terminals 71a, 71b, 71c and 71d, or the state of power source, a power source switch 75, a selecting switch 73, a switch 77 are controlled, so as to energize the electronic device main circuit 78 from the externally connected power source and to charge a built-in battery 74 when the AC adapter is connected.

The electronic device shown in FIG. 6 is provided with separate connectors for the AC adapter input and external battery input, so that the area required for providing the connectors and the number of parts are both considerable.

With the power source device shown in FIG. 7, the connector can be shared, but the number of terminals used in the connector is increased, and it is necessary to detect connection of each of the terminals, and the state of each of switches. The circuit for such detection is complex.

Techniques for sharing a connector is also shown in Japanese Utility Model Kokai Publications No. 121344/1981, No. 141590/1983, No. 70998/1985, No. 90782/1985, and No. 185235/1986. However, these publications do not disclose identifying the type of the power source connected to the common connector, and controlling the internal processing depending on the result of the identification.

SUMMARY OF THE INVENTION

An object of the invention is to provide an electronic device in which a power source connector is shared, and the common power source connector can be connected to any of various power source options including an AC adapter, an external battery and a car battery, and which can identify the type of the power source that is connected to the terminal and which controls the internal processing depending on the result of the identification.

An electronic device according to the present invention comprises:

(a) an external power source connector for connection with an external power source;

(b) a power source identifying means for identifying the power source from which the electronic device is energized; and (c) a control means for controlling consumption of the power in accordance with the power source identified by the power source identifying means.

Since the power source connector is shared and can be connected with various types of power sources including an AC adapter, an external battery and a ear battery, the area required for providing the connector is reduced, and the number of parts forming the connector is also reduced.

Since the voltage identifying means identifies the type of the power source from which the electronic device is energized, and the consumption of power can be appropriately controlled depending on the type of the power source from which the electronic device is being energized.

BRIEF DESCRIPTION OF THE DRAWINGS

FIG. 5A is a flowchart showing the operation of a microcomputer in the embodiment of FIG. 4.

FIG. 5B is a table showing the adapter type signal for each of the power sources used for energizing the personal computer.

FIG. 5C is a diagram showing the characteristics of the sum voltages as output from the adding circuit.

DETAILED DESCRIPTION OF THE PREFERRED EMBODIMENTS

EMBODIMENT 1

Figure 1:
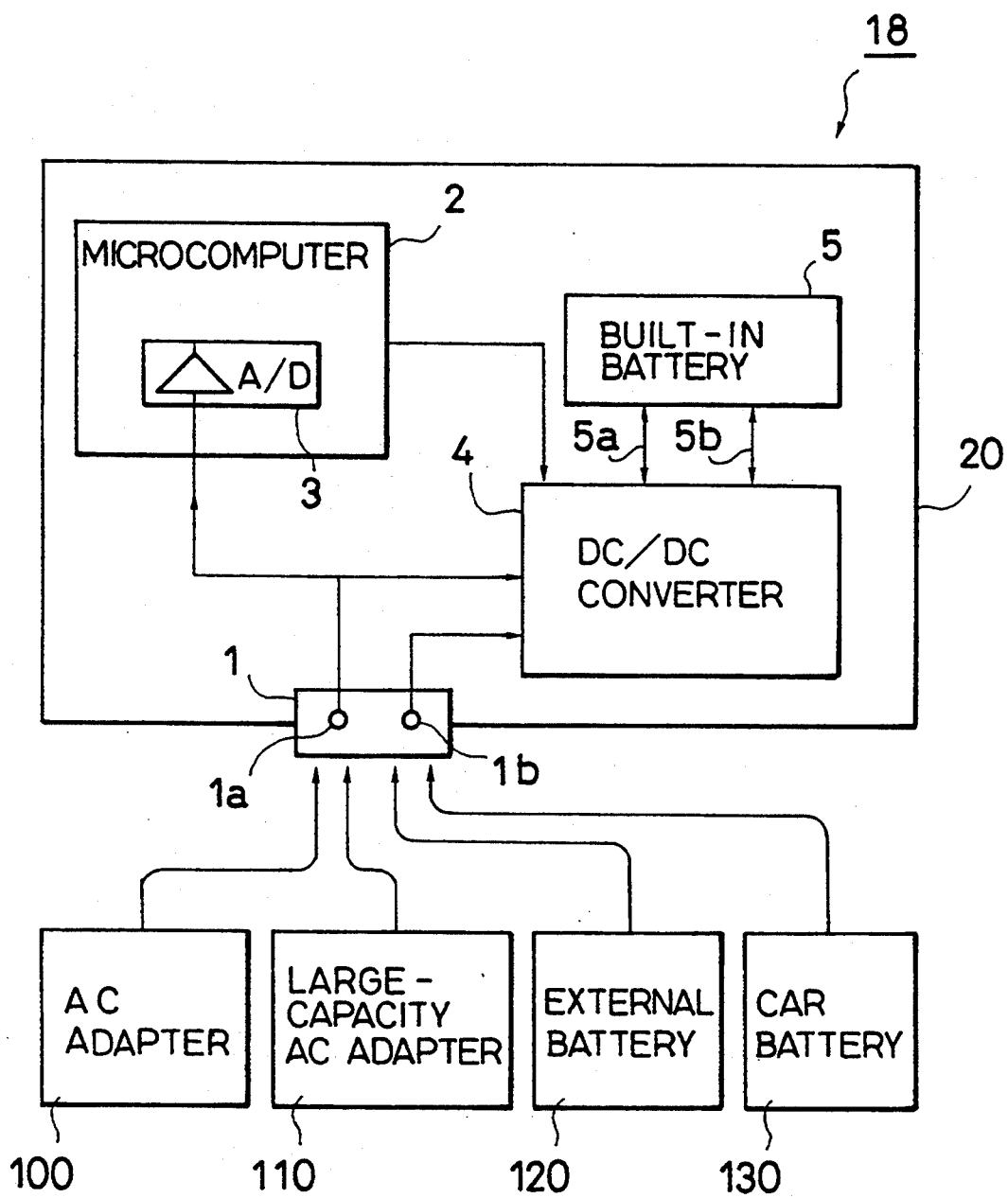
FIG. 1 is a block diagram showing an embodiment of an electronic device according to the present invention.

FIG. 1 is a block diagram showing a notebook-type personal computer .18, which is an example of electronic device according to the present invention. The illustrated personal computer 18 comprises a main unit 20 having a built-in battery 5, and a power source connector 1 provided on the rear wall of the housing of the main unit 20. The power source connector 1 comprises terminals 1a and 1b. These terminals are connected to a ground terminal and an output terminal of an external power source, via a plug of the external power source, which is connected to the connector 1. The personal computer 18 also comprises a microcomputer 2 which performs control over the entire personal computer, and in particular, control over the consumption of power, e.g., charging or non-charging of the built-in battery 5, depending on what type of power source is being used for energizing the personal computer 18. A one-chip microcomputer M37451 (made by Mitsubishi Denki Kabushiki Kaisha (also known as Mitsubishi Electric Corporation)) may be used as this microcomputer 2. An A/D (analog-to-digital) converter 3 is provided in the microcomputer 2. The built-in battery 5 has battery terminals 5a and 5b by which the battery 5 is connected to a DC/DC converter 4.

Shown outside the main unit 20 are an AC adapter 100, a large-capacity AC adapter 110, an external battery 120, and a car battery 130.

In use of the personal computer 20, one of them, or some other external source which is not illustrated, can be connected to the power source connector 1, or none of them may be connected, in which case the computer 20 is energized from the built-in battery 5.

When an AC adapter 100 is connected, the built-in battery 5 can be charged if the main unit is in a power-save state or in a power-off state. When a large-capacity AC adapter 110 is connected, the built-in battery 5 can be charged regardless of the state of the main unit. When an external battery 120 or a car battery 130 is connected, the built-in battery 5 is not charged.

The control over the power consumption is made in the following manner. The microcomputer 2 monitors the voltage of the built-in battery 5, and the voltage on the terminal 1a of the power source connector 1, and identifies the type of the power source which is being used for energizing the personal computer 18. That is, the microcomputer 2 finds what type of the external power source is connected to the connector 1, or none is connected to the connector 1 and the built-in battery 5 is used for the energization. On the basis of the result of the identification, the microcomputer 2 controls the power consumption, e.g., whether to conduct charging of the built-in battery 5.

Figure 2:
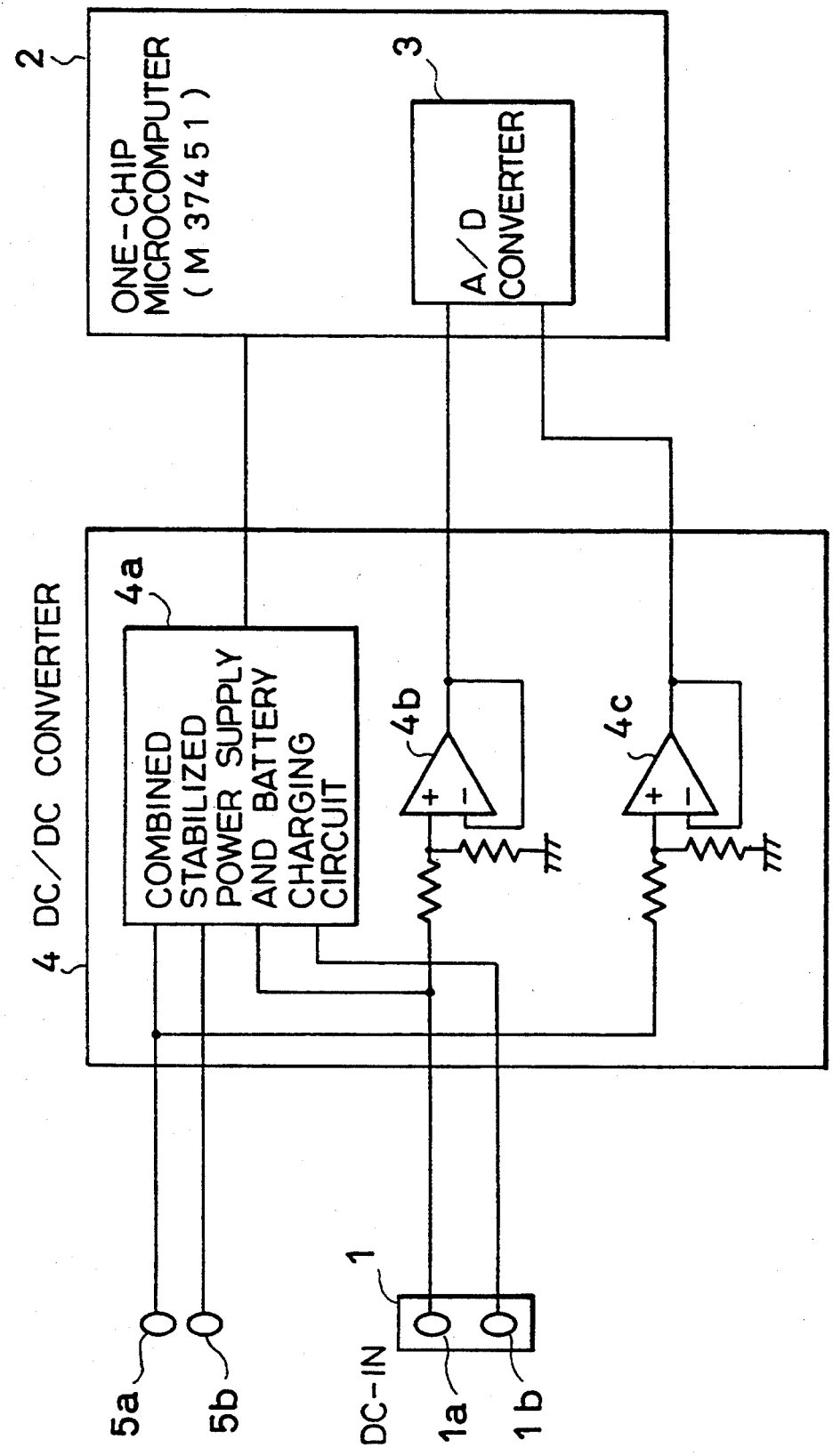
FIG. 2 is a block diagram for explaining the operation of the electronic device according to the invention.

FIG. 2 shows details of the DC/DC converter 4 and the microcomputer 2.

The illustrated DC/DC converter 4 comprises a power source stabilizing/battery charging circuit 4a, a buffer amplifier 4b receiving the power from the power source connector 1 and amplifying the current while maintaining the voltage, and a buffer amplifier 4c receiving the power from the built-in battery 5 and amplifying the current while maintaining the voltage.

Figures 3A, 3B:
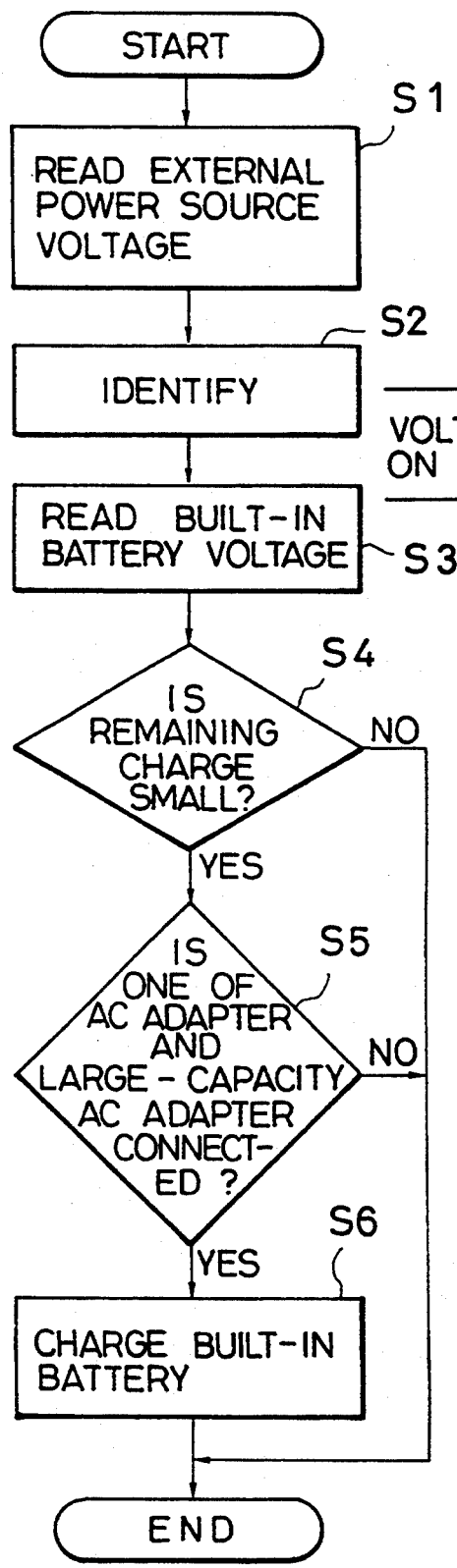
FIG. 3A is a flowchart showing the operation of a microcomputer of the embodiment of FIG. 1.
FIG. 3B is a table showing the voltage on the terminal 1a for each of the power sources used for energizing the personal computer.
Figure 4:
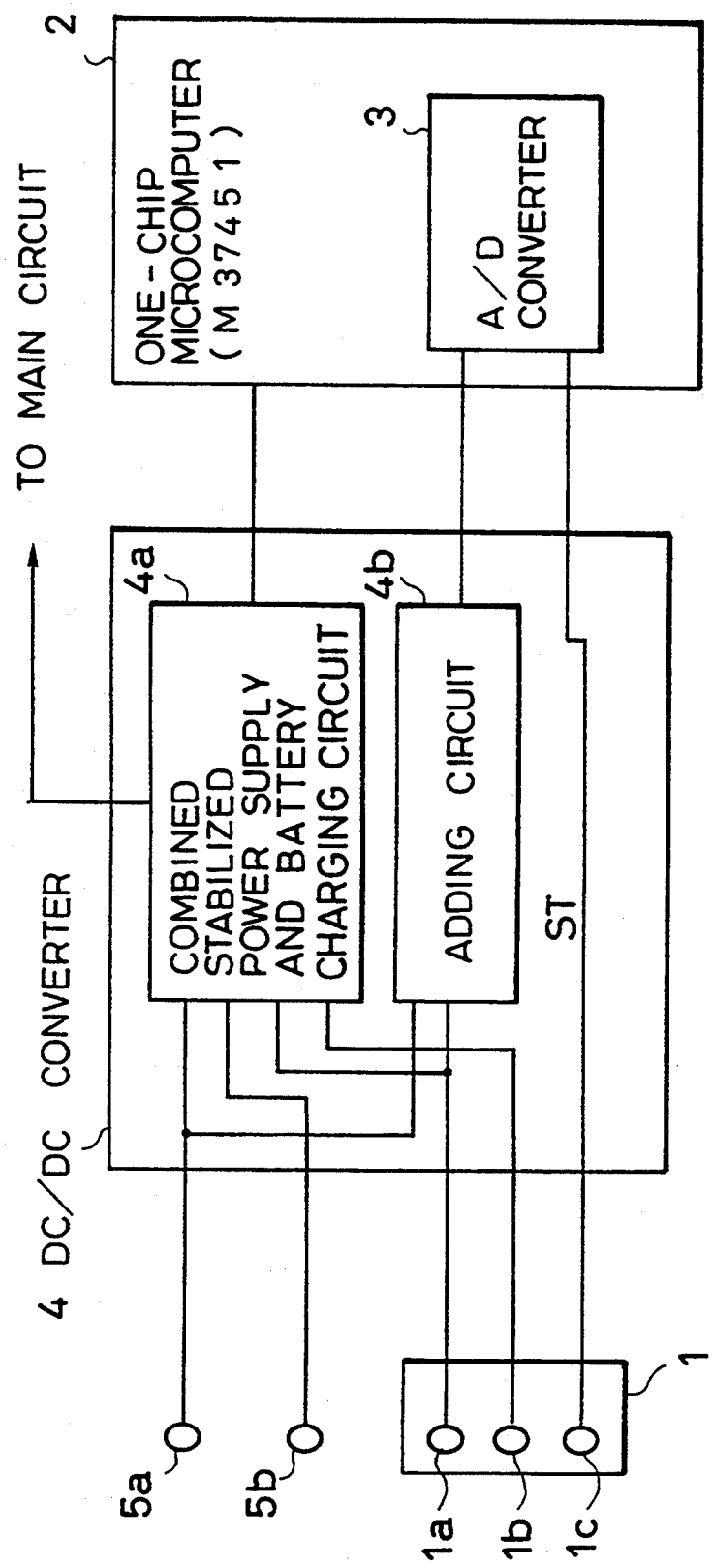
FIG. 4 is a block diagram showing the operation of another embodiment of electronic device according to the invention.
Figure 4A:
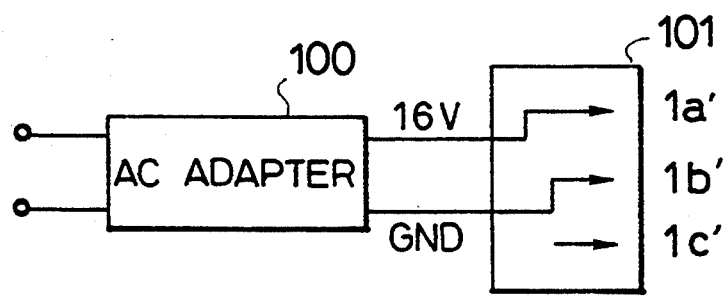
FIG. 4A to FIG. 4D are schematic diagrams showing plugs of the external power sources used in conjunction with the electronic device of FIG. 4.
Figure 4B:
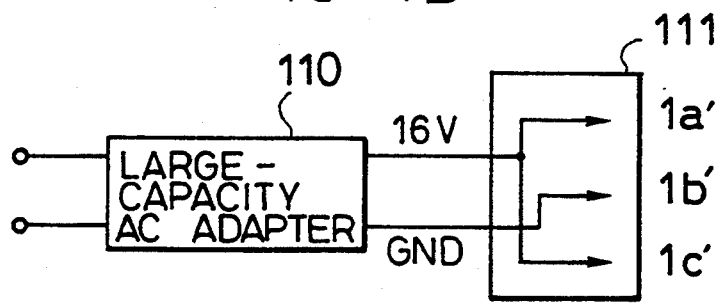
Figure 4C:
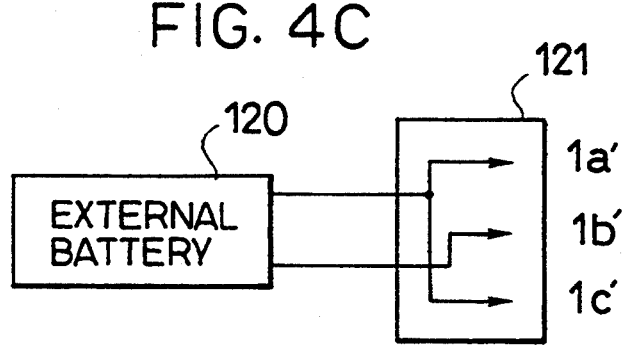
Figure 4D:
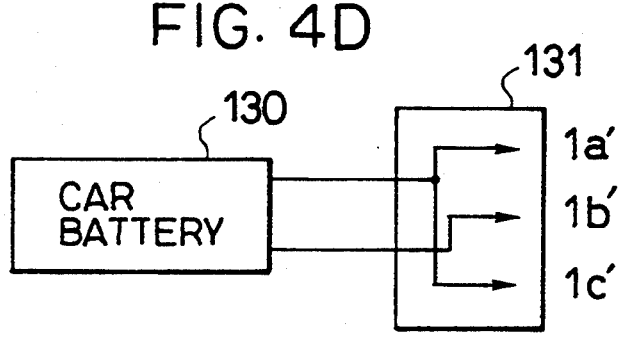
Figure 6:
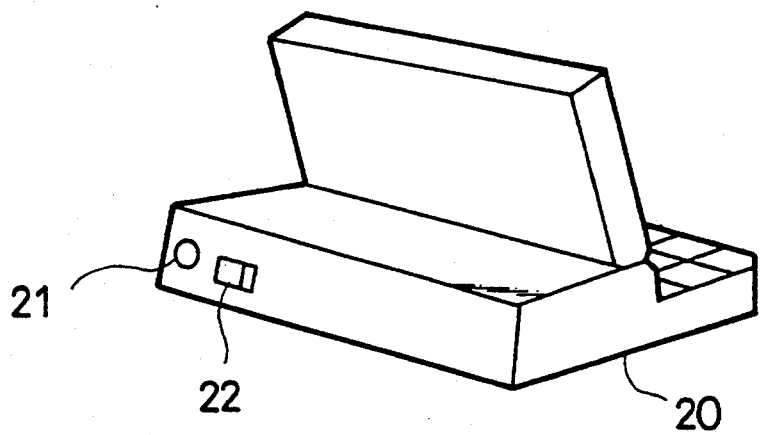
FIG. 6 is a diagram showing power source connectors in a conventional notebook-type personal computer.
Figure 7:
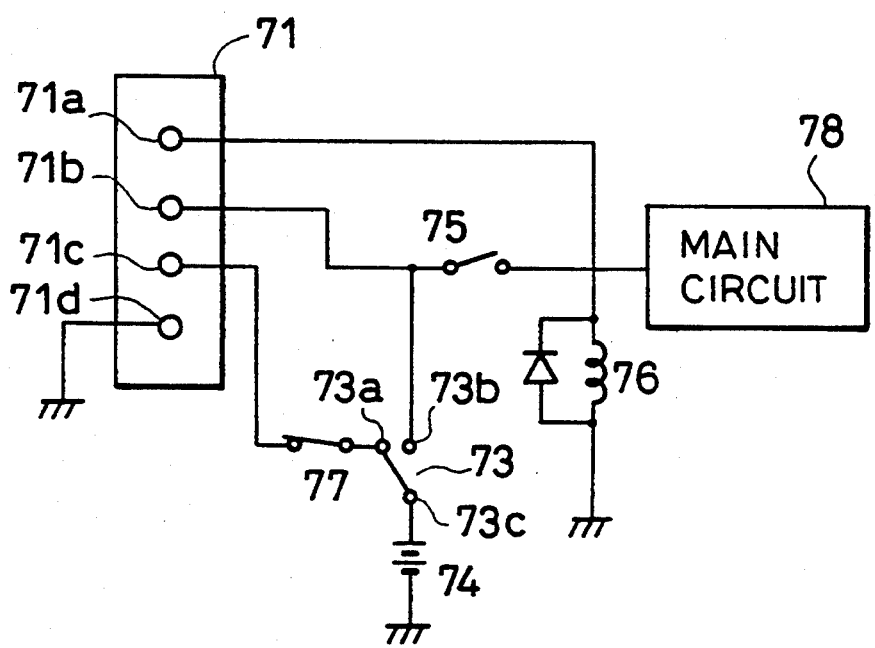
FIG. 7 is a diagram showing the circuit in the conventional power source device.

FIG. 3A is a flowchart showing the operation of the circuit of FIG. 2 when the main unit is in the power-save state or in the power-off state. At step S1, the A/D converter 3 reads the voltage on the power source connector 1, and A/D-converts (digitizes) it, and measures or detects the voltage.

At step S2, the type of the power source is identified on the basis of the detected voltage. For instance, when an AC adapter 100 or a large-capacity AC adapter 110 is connected, the voltage on the power source connector 1 will be about 16 V. When an external battery 120 is connected, the voltage on the power source connector 1 is about 8 to 9.6 V. When a car battery 130 is indicated, the voltage on the terminal 1 is 12 V. Because of the differences between the voltages of the respective types of power sources, the type of the power source that is actually connected to the connector 1 can be identified.

At step S3, the battery input voltage from the built-in battery 5 is detected by the A/D converter 3, and on the basis of this voltage, judgement is made at step S4 as to whether or not the remaining charge in the built-in battery 5 large. If it is found that the remaining charge of the battery is small, judgement is then made at step S5 as to whether or not the connected power source is one of an AC adapter 100 and a large-capacity AC adapter 110. If the answer is affirmative, an instruction is given at step S6 to charge the built-in battery 5 is supplied from the one-chip microcomputer 2 to the battery charging circuit 4a in the DC/DC converter 4.

If it is found at step S4 that the remaining charge in the built-in battery 5 is large, the charging of the battery is not conducted. If it is judged at step S4 that something other than an AC adapter 100 and a large-capacity AC adapter 110, that is, an external battery 120, a car battery 130 or the like is connected, no instruction to charge the built-in battery 5 is output. It is thus ensured that when the personal computer 18 is energized from the type of power source which does not have sufficient current capacity, consumption of power is reduced, in other words the personal computer 18 is made to operate in a reduced-power consumption mode, i.e., in a mode in which the charging of the built-in battery 5 is inhibited.

In the above embodiment, judgement is made on which of the AC adapter, the large-capacity AC adapter, the external battery and the like is connected to the power source connector, by inputting the voltage on the power source connector to the A/D converter in the microcomputer 2 in the personal computer 18, and A/D-converting the input voltage, and further processing is made under control of the microcomputer 2. In the example described, when an AC adapter 100 or the large-capacity AC adapter 110 is connected, the built-in battery 5 is charged, and when an external battery 120 is connected, charging of the built-in battery 5 is not conducted to save power of the external battery 120.

EMBODIMENT 2

Another embodiment of an electronic device according to the invention will next be described with reference to FIG. 4, FIG. 4A to FIG. 4D, and FIG. 5A to FIG. 5C. Embodiment 2 differs from Embodiment 1 in that the connector 1 used in Embodiment 2 has three terminals 1a, 1b and 1c. The terminals 1a and 1b are similar to the terminal 1a and 1b of the connector of Embodiment 1. The terminal 1c is for inputting an external power source type signal ST indicating the type of the adapter. The power source type signal ST is supplied from the external power source with plugs configured as shown in FIG. 4A to FIG. 4D. The plugs 101, 111, 121 and 131 each have three terminals 1a', 1b' and 1c' which are contacted with the terminals 1a, 1b and 1c of the connector 1 when the plug is inserted in the connector 1. The terminal 1a' of each of the plugs is connected to the positive output terminal of the external power source, while the terminal 1b' of each of the plugs is connected to the negative output terminal, i.e., the ground terminal (GND) of the external power source. The terminal 1c' of the plug 101 is open or floating. The terminal 1c' of each of other plugs 111, 121 and 131 is connected to the terminal 1b'. As a result, 0 V is applied to the terminal 1c when an AC adapter 100 is connected, and 16V is applied to the terminal 1c when a large-capacity AC adapter 110 is connected. When an external battery 120 or a car battery 130 is connected, the voltage of the battery is applied to the terminal 1c. When the device is operating on, i.e., energized from the built-in battery, nothing is connected to the connector so that the input to the terminal 1c is 0 V.

The DC/DC converter 4 of this embodiment comprises an external DC voltage/battery voltage adding circuit 4d, which adds the voltage from the terminal 1a and the voltage from the terminal 5a, and converts the sum into a voltage which is within the range processible by the A/D converter 3. For instance, if the A/D converter 3 is capable of converting a voltage within a range of from 0 to 5 V, and the maximum of the sum of the external DC voltage and the battery voltage as determined by the external DC voltage/battery voltage adding circuit 4d is 20 V, the 20 V voltage cannot be properly processed by the A/D converter 3, so the sum is divided by 4 (=20/5) and a voltage within a range up to 5 V is applied to the A/D converter 3.

The operation of the microcomputer of this Embodiment will now be described with reference to FIG. 5A.

At step S10, the output of the external DC voltage/battery voltage adding circuit 4d is input to the A/D converter 3, and a corresponding digital signal indicating the output of the adding circuit 4d is stored in a memory, not shown, in the microcomputer 2. At step S11, the input voltage of the power source type signal from the terminal 1c is input and A/D-converted. On the basis of these two voltages, the type of the power source is identified by referring to the Table shown in FIG. 5B. As shown in FIG. 5B, the power source type signal ST indicates different voltages depending on the power source. However, in the case of an AC adapter and a built-in battery, the power source type signal ST is 0 V, so they cannot be discriminated or distinguished from each other when the identification is based on the power source type signal ST alone. However, according to this embodiment, the sum of the voltage on the terminal 1a and the voltage of the built-in battery 5 is determined, and this sum is also used for the identification. That is, when an AC adapter is connected, the voltage on the terminal 1a is about 16 V, while the voltage of the built-in battery is about 9.6 V, so the sum is about 25.6 V. On the other hand, when no AC adapter is connected, the output of adding circuit 4d indicates about 9.6 V. Since the voltage of the built-in battery varies with the remaining charge of the battery, illustrated in FIG. 5C, the discrimination as to whether or not an AC adapter is connected must be made taking account of the variation. More specifically, the voltage of the built-in battery 5 varies with discharge as indicated by curve 51 in FIG. 5C, whereas the above-mentioned sum varies with discharge of the built-in battery 5 as indicated by curve 52 in FIG. 5C. The threshold used for the discrimination is set between the two curves 51 and 52. The above-mentioned sum used for the discrimination is read at step S10.

By using the above-mentioned sum for the discrimination between the case where an AC adapter is connected, and a case where no external power source is connected, even when the power source type signal is 0 V in either of the cases, discrimination between the two cases can be made, and identification of the type of the power source connected can be made whatever power source is connected or none is connected.

At step S13, on the basis of the result of identification obtained at step S12, a threshold value for testing the remaining charge of the built-in battery 5 is obtained. This threshold value differs depending on the power source from which the personal computer is energized. For instance, when an AC adapter 100 and a built-in battery 5 are both connected, the threshold value is set for example at 532 below which the above-mentioned sum falls when the remaining charge of the built-in battery 5 becomes small. When the built-in battery alone is connected, the threshold value is set for example at 531 below which the voltage of the built-in battery 5 (equal to the above-mentioned sum) falls when the remaining charge of the built-in battery 5 becomes small. Then at step S14, judgement is made on whether or not the output of the external DC voltage/battery voltage adding circuit 4d exceeds the threshold 532 or 531, and if the output of the external DC voltage/battery voltage adding circuit 4d is found to be smaller than the threshold value, the remaining charge in the built-in battery 5 is found to be small. The process then proceeds to step S15, where judgement is made whether the large-capacity AC adapter 110 is connected. If the answer is affirmative, the process proceeds to step S17, where an instruction is output to charge the built-in battery 5. If at step S15, it is found that the large-capacity AC adapter 110 is not connected, the process then proceeds to step S16 where judgement is made as to whether or not an AC adapter is connected. If the answer is affirmative, the process proceeds to step S18, where judgement is made as to whether or not the main unit is in one of the power-save state and the power-off state. If the answer is affirmative, the process proceeds to step S17, where an instruction is output to charge the built-in battery 5. If the answer is negative at step S14, step S16, or step S18 no instruction to charge the built-in battery 5 is output.

The operation of the Embodiment 2 can be summarized as follows:

(1) When an AC adapter 100 is used.

The power source type signal ST is 0 V, and the built-in battery 5 can be charged if the personal computer 18 is in a power-save state or in a power-off state.

(2) When a large-capacity AC adapter 110 is used.

The power source type signal ST is a DC voltage of 16 V. The built-in battery 5 can charged regardless of the state of the personal computer 18.

(3) When an external battery 120 is used.

The power source type signal ST is a DC voltage of 9.6 V. The built-in battery 5 is not charged.

(4) When a car battery 130 is used.

The power source type signal ST is a DC voltage of 12 V. The built-in battery 5 is not charged.

(5) When a built-in battery 5 alone is connected.

The power source type signal ST is in an open state (0 V). The built-in battery 5 is not charged.

Modifications

In the Embodiments 1 and 2, an A/D converter 3 is used to identify the voltage input through the power source connector. But the A/D converter is only an example, and other means for identifying the power source can be used instead.

In the Embodiments 1 and 2, a one-chip microcomputer 2 is used as an example of control means, and a power source connector 1 is shared by a plurality of types of external power sources, so the option for identifying the power source and for controlling the power consumption is implemented by a software of the microcomputer. But other hardware circuits or other programs may be used to control consumption of the power supplied through the power source connector.

In the Embodiments 1 and 2, the A/D converter is built in a one-chip microcomputer. The A/D converter and the one-chip microcomputer may be formed of separate circuits.

In the Embodiments 1 and 2, the electronic device is a notebook-type personal computer. The invention is applicable to other electronic devices, such as other types of computers, dedicated word processors, electronic type writers, and audio and video devices.

In the above embodiments, control over charging of a built-in battery is made depending on the type of the power source externally connected. The control means may alternatively be adapted to vary the brightness of a display device, to control the supply of power to floppy-disk drives, or to control the power consumption in some other way, depending on the type of the externally connected power source.

Advantages

As has been described, according to the invention, the number of parts, such as connectors, can be reduced, and yet identification of the type of the power source from which the electronic device is energized can be achieved.

In the prior-art notebook-type personal computer, separate connectors are provided for the AC adapter, and the external battery. In the invention, only a single common connector is required, so that the number of parts can be reduced. Moreover, a new option, e.g., an adapter for taking a power source through a cigarette terminal of a ear, can be developed without changing the hardware.

What is claimed is:

1. An electronic device which can be energized from at least three types of power sources, comprising:
    (a) only one external power source connector for connection with an external power source having a type which is of the at least three types of power sources, said external power source connector having only two terminals;
    (b) a power source identifying means responsive to said external power source connector, for identifying the type of any external power source connected to the external power source connector and for distinguishing among all of the at least three types of power sources from which the electronic device is energized; and
    (c) a control means for controlling consumption of power in accordance with the power source type identified by the power source identifying means.

2. An electronic device as set forth in claim 1, wherein said power source identifying means detects the voltage on the external power source connector, and identifies the power source in accordance with the detected voltage.

3. An electronic device as set forth in claim 1, wherein one of said types of power sources is a built-in battery.

4. An electronic device as set forth in claim 3, wherein said control means controls charging of the built-in battery.

5. An electronic device which can be energized from at least three types of power sources, comprising:
    (a) an external power source connector for connection with an external power source;
    (b) a power source identifying means for identifying the type of the at least three types of power sources from which the electronic device is energized, wherein one of said types of power sources is a built-in battery, wherein said power source identifying means detects the voltage on the external power source connector, detects the voltage of the built-in battery, determines the sum of the voltage on the external power source connector and the voltage of the built-in battery, and identifies the power source in accordance with the detected voltage on the external power source connector and said sum; and
    (c) a control means for controlling consumption of power in accordance with the power source type identified by the power source identifying means.

6. The electronic device of claim 5 wherein the power source identifying means is constructed to distinguish between at least three types of power source.

7. The electronic device of claim 6 wherein the power source identifying means is constructed to distinguish between at least four types of power source.

8. A method of supplying power to an electronic device, comprising:
    receiving power from a selected power source via only one electrical connection, which connection only includes two terminals;
    detecting a voltage supplied by the received power;
    distinguishing between a plurality of voltages which may be received via the electrical connection to detect a type of the selected power source on the basis of the power received in the step of receiving; and
    controlling, based on said step of distinguishing, consumption of power by the electronic device.

9. The method of claim 8 further including the step of further distinguishing between a plurality of power states of the electronic device, and wherein said step of controlling is also based on said step of further distinguishing.

10. The method of claim 8 wherein said step of selecting is performed from at least four power source types.

11. An electronic device which can be energized from one of a plurality of types of power source including a built-in battery, comprising:
    (a) only one external power source connector for connection with an external power source having one of plurality of types, said external power source connector only two terminals;
    (b) a power source identifying means said external source connector, for identifying the type of any external power source connected to the external power source connector; and
    (c) a control means for controlling consumption of the power in accordance with the type of power source identified by the power source identifying means, and for controlling charging of the built-in battery in accordance with the type of external power source identified by the power source identifying means.

12. An electronic device which can be energized from one of a plurality of types of power source including a built-in battery, comprising:
    (a) an external power source connector for connection with an external power source;
    (b) a power source identifying means for identifying the power source from which the electronic device is energized; and (c) a control means for controlling consumption of the power in accordance with the power source identified by the power source identifying means, wherein said power source identifying means detects the voltage on the external power source connector, detects the voltage of the built-in battery, determines the sum of the voltage on the external power source connector and the voltage of the built-in battery, and identifies the power source in accordance with the detected voltage on the external power source connector and said sum.

13. The electronic device of claim 12 wherein the power source identifying means is constructed to distinguish between at least three types of power source.

14. The electronic device of claim 13 wherein the power source identifying means is constructed to distinguish between at least four types of power source.

15. The electronic device of claim 12 wherein the control means controls charging of the built-in battery based on the identification of the power source by the control means.

* * * * *